(12) United States Patent
Serafat et al.

(10) Patent No.: US 7,849,415 B1
(45) Date of Patent: Dec. 7, 2010

(54) COMMUNICATION TERMINAL

(75) Inventors: Reza Serafat, Bochum (DE); Wolfgang Theimer, Bochum (DE); Udo Gortz, Bochum (DE); Klaus Rateitschek, Bochum (DE); Peter Buth, Bochum (DE); Frank Dufhues, Bochum (DE); Thomas Druke, Bochum (DE); Amir Imam, Mülheim a.d. Ruhr (DE); Christian Steinert, Langeln (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/258,213

(22) PCT Filed: Apr. 20, 2000

(86) PCT No.: PCT/IB00/00561

§ 371 (c)(1),
(2), (4) Date: Apr. 17, 2003

(87) PCT Pub. No.: WO01/82561

PCT Pub. Date: Nov. 1, 2001

(51) Int. Cl.
*G06F 3/048* (2006.01)

(52) U.S. Cl. .................. 715/769; 715/205; 715/771; 709/206; 709/207

(58) Field of Classification Search .................. 701/1, 701/36; 715/727, 716, 829, 854, 864, 744, 715/501.1, 760–765, 771, 20, 206, 769; 709/205, 206, 239
See application file for complete search history.

(56) References Cited

U.S. PATENT DOCUMENTS

| | | | | |
|---|---|---|---|---|
| 4,630,196 A | * | 12/1986 | Bednar et al. | 709/202 |
| 4,703,475 A | * | 10/1987 | Dretzka et al. | 370/394 |
| 5,307,463 A | * | 4/1994 | Hyatt et al. | 710/1 |
| 5,361,363 A | * | 11/1994 | Wells et al. | 712/22 |
| 5,396,537 A | * | 3/1995 | Schwendeman | 340/7.23 |
| 5,657,252 A | * | 8/1997 | George | 702/83 |
| 5,680,551 A | * | 10/1997 | Martino, II | 709/226 |
| 5,717,862 A | * | 2/1998 | Annapareddy et al. | 709/237 |
| 5,732,074 A | * | 3/1998 | Spaur et al. | 370/313 |
| 5,745,760 A | * | 4/1998 | Kawamura et al. | 719/310 |
| 5,802,278 A | * | 9/1998 | Isfeld et al. | 709/249 |
| 6,081,815 A | * | 6/2000 | Spitznagel et al. | 715/501.1 |
| 6,122,682 A | * | 9/2000 | Andrews | 710/65 |
| 6,125,399 A | * | 9/2000 | Hamilton | 709/245 |
| 6,216,173 B1 | * | 4/2001 | Jones et al. | 715/705 |
| 6,223,212 B1 | * | 4/2001 | Batty et al. | 709/204 |
| 6,275,231 B1 | * | 8/2001 | Obradovich | 345/156 |
| 6,282,491 B1 | * | 8/2001 | Bochmann et al. | 701/209 |
| 6,298,372 B1 | * | 10/2001 | Yoshikawa | 709/200 |
| 6,314,094 B1 | * | 11/2001 | Boys | 370/352 |
| 6,321,337 B1 | * | 11/2001 | Reshef et al. | 726/14 |
| 6,356,283 B1 | * | 3/2002 | Guedalia | 715/760 |
| 6,401,034 B1 | * | 6/2002 | Kaplan et al. | 701/209 |
| 6,405,049 B2 | * | 6/2002 | Herrod et al. | 455/517 |
| 6,505,100 B1 | * | 1/2003 | Stuempfle et al. | 701/1 |

(Continued)

FOREIGN PATENT DOCUMENTS

WO   WO 98/33127 A1   7/1998

*Primary Examiner*—Tadeese Hailu
(74) *Attorney, Agent, or Firm*—Alston & Bird LLP

(57) ABSTRACT

A communication apparatus is disclosed. The apparatus has an input/output (I/O) controller and a processor hosting a number of applications. The I/O controller responds to messages encoded according to a defined markup language. The applications communicate using the structure of the defined markup language.

35 Claims, 2 Drawing Sheets

U.S. PATENT DOCUMENTS

| | | | |
|---|---|---|---|
| 6,628,233 B2 * | 9/2003 | Knockeart et al. | 342/357.1 |
| 6,754,485 B1 * | 6/2004 | Obradovich et al. | 455/414.1 |
| 6,779,004 B1 * | 8/2004 | Zintel | 709/227 |
| 6,810,520 B2 * | 10/2004 | Lu et al. | 719/310 |
| 6,880,016 B1 * | 4/2005 | Van Der Heijden et al. | 709/230 |
| 6,993,559 B2 * | 1/2006 | Jilk et al. | 709/206 |
| 7,062,535 B1 * | 6/2006 | Stark et al. | 709/206 |
| 7,130,213 B1 * | 10/2006 | Raszka | 365/149 |
| 7,167,796 B2 * | 1/2007 | Taylor et al. | 701/213 |
| 7,209,892 B1 * | 4/2007 | Galuten et al. | 705/26 |
| 7,308,646 B1 * | 12/2007 | Cohen et al. | 715/234 |
| 2001/0042131 A1 * | 11/2001 | Mathon et al. | 709/238 |
| 2002/0087655 A1 * | 7/2002 | Bridgman et al. | 709/217 |
| 2003/0191799 A1 * | 10/2003 | Araujo et al. | 709/203 |
| 2003/0233420 A1 * | 12/2003 | Stark et al. | 709/206 |
| 2006/0168644 A1 * | 7/2006 | Richter et al. | 726/2 |

* cited by examiner

COMMUNICATION TERMINAL

BACKGROUND OF THE INVENTION

1. Field of the Invention

This invention relates to a multi-function mobile communication apparatus. It finds particular, but not exclusive, utility in in-vehicle communication equipment.

2. Description of the Prior Art

Traditional mobile telephone devices are being supplemented with apparatus offering greater functionality than merely the ability to make and receive telephone calls. The field of in-vehicle units, in particular, offers great potential for the provision of new and improved services. Such units are called telematics units, and can offer the user, amongst other features, navigation services, traffic alerts and Internet access in addition to telephone services.

Traditional telephone devices are limited in their functionality, and when a user wishes to add new features, often the only choice is to purchase new equipment. With the speed of growth of services available, this can prove to be a costly and wasteful exercise.

In-vehicle telematics units can be physically larger than the personal hand-held units which users are accustomed to carrying with them, and as such, greater functionality can be incorporated into them, including the possibility of adding new hardware through the use of expansion slots, or similar.

A problem with adding new applications to such units is ensuring that new applications are capable of operating successfully with the existing applications.

Communication between modules in prior art systems tends to follow rigid pre-defined protocols. The format is specified, and all communications with that module must ensure that the appropriate data appears at the correct position within the message.

SUMMARY OF THE INVENTION

According to a first aspect of the present invention, there is provided a communication apparatus comprising: an input/output controller comprising at least one input means to receive instructions from a user, and at least one output means to convey information to a user, responsive to messages encoded using a predetermined mark-up language; and a processor hosting a plurality of applications, wherein the applications are arranged to communicate via messages having the structure of the predetermined mark-up language.

According to a second aspect of the present invention, there is provided a method of operating a modular communication apparatus comprising a processor hosting a plurality of applications and an input/output controller, message transfers between the input/output controller and the processor are encoded using a predetermined mark-up language, wherein communications between the processor and an application use the structure of the predetermined mark-up language.

Advantageously, embodiments of the invention provide modular communications devices to which new applications may be added easily. This is due to the use of an open standard for communication between the various modules of the apparatus.

The communications unit of the invention comprises a number of modules having defined functions. The modules comprise an input/output controller, a central processor or task controller as well as the various application units, which perform specialised tasks.

The open standard used for all communications between the modules is based on a Mark-up Language. Such textual encoding of information is routinely used to control the attributes of information to be displayed. From the earliest days of printing, mark-up language has enabled proofreaders to instruct printers how to set up the type so that certain formatting features may be realized. A mark-up language basically allows labels or tags to be added to text, which are interpreted to alter the appearance of the text. This process has been adopted to control the appearance of pages on the World Wide Web (WWW). Hyper Text Mark-up Language (HTML), which is a specific variant of Standard Generalized Mark-up Language (SGML), has been formally adopted as the method by which information is encoded on the WWW. HTML has spawned further variants, including Wireless Mark-up Language (WML), which is especially tailored for use with wireless communication devices.

An advantage of using a message format that is based on one which is primarily intended for controlling the displayed appearance of information, is that messages which are intended for output to the user require little or no further processing once they have left the application which created them.

Advantageously, applications according to embodiments of the invention do not have to have their own I/O controllers. All I/O is managed by the I/O controller under instruction from each application.

An example of a very simple page of HTML is given below to illustrate the nature of mark-up languages.

| | |
|---|---|
| <HTML> | Defines HTML Coding beginning |
| <HEAD> | Start of HEAD section |
| <TITLE> | Start of TITLE definition |
| Sample Page | Text of TITLE displayed with window |
| </HEAD> | End of HEAD section |
| <BODY> | Start of BODY section |
| <P ALIGN="CENTER"> | Start of new paragraph, centred |
| <B><U>Sample Text</U></B> | Text for display, bold, underlined |
| </P> | End of paragraph |
| </BODY> | End of BODY section |
| </HTML> | End of HTML code |

This example shows how a relatively large amount of textual tag information, i.e. the elements enclosed in angle brackets (< >), needs to be added in order to define the appearance of a very simple WWW page.

In HTML and WML, the tags, which are part of the coded text, are present to control the appearance of the text, which is to be displayed. For instance, tags can be added to the text which can cause it to be in a bold typeface, in italics, underlined, centered, right justified or a host of other options. Tags can also be used to introduce graphic or sound files into the displayed text.

Embodiments of the invention benefit from using the structure of a mark-up language for communications between their various modules. Tags can be used to clearly label information elements within messages. The tags in these messages may be used to identify particular items of information which may be for purely internal control purposes, and are never intended for display to the user.

Use of such tags requires significantly more data to be sent between the various modules than in prior art systems, because the tag, which identifies the type of data, has to be transmitted along with the data itself. In prior art systems, such coding was implicit. For instance, prior art systems have rigidly defined communication protocols where certain data elements must appear in certain defined positions within the message, and no tag is transmitted along with the message. Using a system built using mark-up language structure, the relative position of data within the message, and the number of instructions contained within a message can become relatively unimportant.

Although using such a system of communication results in a greater amount of data being transferred between modules, and in greater intelligence being required in the application modules to create and decode the encoded messages, it allows for greater flexibility in module design, and in greater scope for adding new applications.

Using a mark-up language to format messages for output is the basis of known web browsers. The output driver of the I/O controller interprets the received marked up text, and controls a display, according to the coded instructions contained in it.

Embodiments of the invention have an I/O controller, which receives output messages from the central processor or task controller. A difference between prior art solutions and embodiments of the invention is that user inputs to the I/O controller are interpreted by the I/O controller and structured into a mark-up language encoded message which is then passed to the task controller. If the message is not destined for the task controller, but for another module of the unit, specifically an application, as indicated by the header of the message, then the task controller, using its routing function, routes the message, unaltered, to the appropriate application. The routing function provided by the central processor requires very little computational power, and may enable a lower specification processor to be used, than the case where the central processor has to actively process messages even when they are destined for another module.

Using such a mark-up language for communication in a situation where such information is used only internally, and is not intended for display, is in contrast to prior art systems, where the tags which are added to the information have, up until now, only been used to control the appearance of the information.

However, use of a mark-up language for all communication between modules offers the advantage new applications can be created having relatively simple interfaces. It also enables the telematics unit to be constructed either with a relatively simple central processor, or with a more complex processor having ample spare processing capacity for the support of new applications.

It is often desirable to be able to enhance the operation of communications equipment in a manner similar to the ease with which personal computers may be upgraded. Embodiments of the invention allow new applications to be added in a straightforward procedure.

In order to add new applications, the new application must be logged with the resource management module, which is a database containing details of all applications, of the unit so that the task controller is aware of certain characteristics of the new application. The logging process may be carried out when the new application is either physically installed, in the case of hardware applications, or, in the case of purely software applications, when it is downloaded.

BRIEF DESCRIPTION OF THE DRAWINGS

For a better understanding of the present invention, and to understand how the same may be brought into effect, the invention will now be described, by way of example only, with reference to the appended drawings in which.

DESCRIPTION OF THE PREFERRED EMBODIMENT

Figure 1:
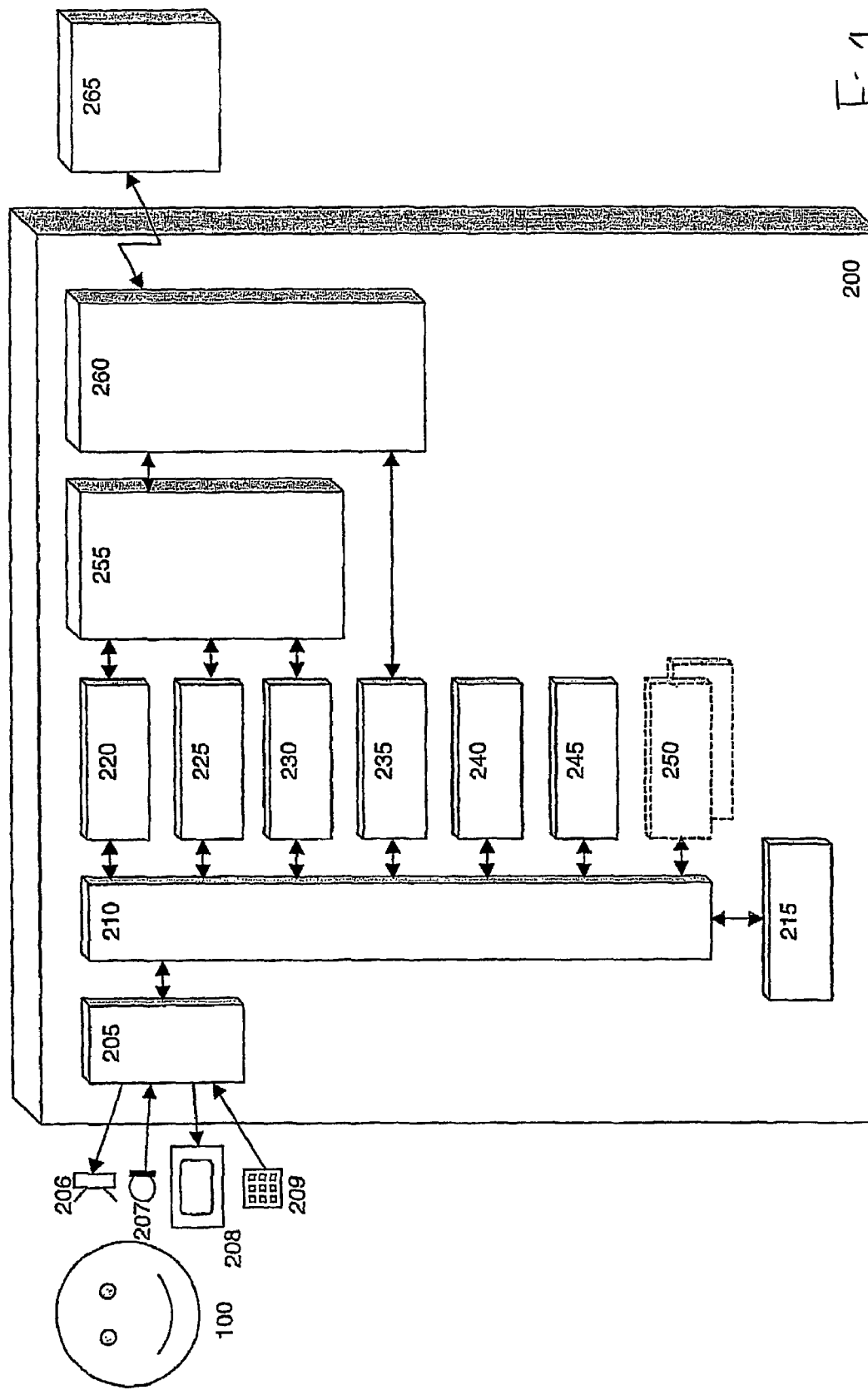
FIG. 1 shows a block diagram of a telematics unit according to an embodiment of the invention.

A block diagram of a communication device according to an embodiment of the invention is shown in FIG. 1. This shows a telematics unit 200, which allows a user 100 to operate the unit in a number of operating modes to access a range of voice and data services.

Within the unit 200, there are a number of functional parts. Input/output controller (I/O) 205 provides the user-interface to the unit 200, allowing the user to input data to the terminal, and to receive data from the terminal. The unit 200 is configured to support a variety of input and output types. As well as the standard key-presses, which would normally be used to control a radio telephone, it may be capable of interpreting the user's voice commands. This is useful when the terminal is installed in a vehicle, as the user must be able to operate the terminal while being distracted as little as possible from the task of controlling the vehicle. By the same token, the I/O controller can provide audio feedback to the user as well as, or instead of, the usual visual feedback, which is presented on a display of the terminal. The I/O controller is therefore connected to at least a loudspeaker 206, a microphone 207, a display device 208 and a keypad 209. Certain options for input and output may be made available depending on the exact model of telematics unit purchased. For instance, speech recognition may only be offered on more expensive models of the unit.

The I/O controller 205 is connected to the task controller 210, and is arranged to interpret data received from the task controller that is formatted according to a predetermined mark-up language. The mark-up language may be HTML, WML, or any similar variant of these languages.

All messages received by the I/O controller 205 from the task controller 210 which are destined to be output to the user are encoded using the mark-up language. If the message is examined, then it's format is seen to closely resemble standard HTML code. For instance, if the display needs to show the user a list of telephone numbers stored in the telephone, then an appropriate message is created by the telephone management function 235, and this is routed via the task controller to the I/O controller which causes the unit's display to operate to show the data as instructed.

When an instruction is received from the user, whether the instruction is a key press, voice command or some other input, the I/O controller 205 receives the instruction, and creates an encoded message using mark-up language, and transmits the message to the appropriate application via the task controller 210. In this way, the I/O controller is able to communicate with any application module in the unit 200.

The task controller (TC) 210 is the central processor for the telematics unit 200. Its prime function is the control of all application units, and also the routing of communications between them. Its functionality is described in more detail later. The task controller is provided with all the peripherals that would normally be associated with a processor, such as ROM, RAM and clocks. Such peripherals are not shown or described here.

In order to manage the application units, the task controller 210 has access to the resource management module 215 which stores information relating to each of the application units attached to the task controller 210. The stored information may vary, but may relate to the physical address or location of the application, the type of information which is needed by each application unit to perform its task, and also what type of information it is capable of supplying to other application units.

Functionally connected to the task controller 210, although some may be purely software implementations, are the various applications which provide the terminal with its functionality. FIG. 1 shows the following units as examples, but other applications could be present: Navigation System 220; Traffic Information Application 225; Internet/WAP browser 230; Telephone management application 235; Global Positioning System (GPS) Receiver 240; and In-car entertainment system 245. Also shown is a future additional application, or applications, 250 for the system.

Navigation System 220 is an application, which provides the user of the terminal 200 with real-time navigational information, enabling planning of a journey, and to receive route instructions while driving to s destination. Such a navigational system may be of the type commonly known as Centrally Determined Route Guidance (CDRG), or a localized system relying on a local data store, such as a CD-ROM, to provide route information.

In a CDRG system, which is preferred, the user inputs to the terminal a destination, and any route preferences. This data is transmitted to a remote computer 265 via a service gateway 255 and telephone unit 260. The remote computer 265 is supplied with up to date route information, and calculates an optimal route for the user's journey. This route is then transmitted to the telematics unit 200. Using data provided from the Global Positioning System (GPS) Receiver 240, the user is guided along the calculated route. As an alternative to using a GPS positioning system, a dead-reckoning system may be used which receives prime position data from a communications network, and re-calculates the current position using an electronic compass and a system which calculates distance traveled on the basis of the number of turns of the car wheels.

The terminal may be configured to provide a visual display to the user of the appropriate route to follow to reach his destination. For example, an arrow pointing left and the characters '100 meters' may be displayed, indicating to the driver that he should turn left in 100 meters. Alternatively, or in addition, a voice prompt may be used to inform the driver of an upcoming manoeuvre.

To further increase the utility of such a navigation application 220, a traffic information service 225 is available. This may be used as a stand-alone application to inform the user of delays, road works or accidents in the vicinity, or the traffic information server may be used in conjunction with the navigation system, allowing the route to be re-calculated in real-time in response to any problems with the previously calculated route. The terminal will thus be able to divert the user down a different route in order to avoid roadworks on the originally planned route for instance. The traffic information may be supplied centrally by, for instance, a roadside assistance/break down company, public broadcast radio or the police.

A browser application 230 is provided. This application allows the user to access pages of information from remote computers via the wireless link. The browser application may be configured to support pages in any number of possible formats including WWW pages coded in HTML and Wireless Application Protocol (WAP) pages coded in WML.

Using the browser application 230, the user will have access to a wealth of information, comparable to that obtainable from a desktop computer connected to the Internet. Pages of information are requested by the user, and such requests, together with the received pages, are processed by the service gateway 255 and the telephone function 260 in a known manner.

A telephone management application 235 is provided to enable the user to control certain features of the portable radio telephone function 260. This function encompasses tasks such as phone book management, performance customization and ancillary services, as well as initiating or answering calls. Customization functions include allowing the user to define individual ring tones, set up call management functions such as call-forwarding, and receive and monitor voice mail messages, for instance. Ancillary services may include features such as sending and receiving text messages such as GSM's Short Message Service (SMS).

As mentioned previously, 240 is a positioning system. Preferably, it is a GPS (Global Positioning System) receiver which provides a highly accurate indication of the current position. However, GPS receivers are relatively expensive, and it may be possible to provide adequate positional accuracy via use of a dead-reckoning system as previously described. The GPS option may, therefore, be restricted to more expensive variants of the unit 200.

Due to the integrated nature of the telematics unit 200, an in-car entertainment system 245 is provided. This may comprise any or all of the following well-known components: radio; cassette player; CD player; MiniDisc player; and MP3 player. It is possible to arrange for the entertainment system to be interrupted in the event that an incoming telephone call is received. Other events, such as incoming emails or travel announcements, for instance, may also interrupt the entertainment system.

It can be seen that it is possible to provide a telematics unit, which offers a range of different services to the user. However, traditionally, such units have not offered a great scope for expansion and re-configuration, as they have not been configured to allow such expansion.

As can be seen by the dotted box 250 on FIG. 1, one or more additional application unit(s) may be added. This may take the form of a new hardware module, which is added, via an expansion slot. An example of such a module is a CD-ROM drive for data storage for use by one or more of the other application units. Equally, the new application module could be a purely software solution which may be downloaded via the telephone 260 and service gateway 255. An example of such an application is a software package allowing the user to keep track of personal and business mileage, for instance.

Service gateway 255 is the interface between the applications that require external data access, and the telephone function 260.

The telephone function 260 of the unit may be considered to be a regular portable telephone, which has been incorporated into the telematics unit 200. It offers all the regular functions normally associated with such a telephone.

It is preferable to arrange the telematics unit 200 such that application units from third-party suppliers can be easily incorporated. A problem with other expandable systems, such as personal computers, is that the interface between the various applications, or the applications and the operating system itself, can be very complicated. This can be due to the huge variety of functions which may need to be performed by any newly introduced peripheral, and the need to grant access to the PC's main data buses, for instance.

As an example of how a new application may be added, consider a telematics unit 200, originally purchased without a GPS receiver module, and equipped instead with the dead-reckoning system described previously. The user decides to upgrade the unit, and purchases a GPS module to replace the earlier dead-reckoning system.

The user needs to physically install the new hardware, which may be accomplished through plugging the GPS module into a provided expansion slot. The user may also need to download some new software, which can be accomplished via the wireless link from a suitable remote computer. As part of the installation process, the details of the new application are registered in the resource management module. An example of the kind of information which is recorded might be as follows:

| | |
|---|---|
| Slot: | 6 |
| Label: | GPS |
| Input: | provide_posn(0,1:n); requestor |
| Output: | posn(xy); requestor |

This tells the task controller that the application resides in logical slot 6, and is labelled GPS. It also tells it that the application expects a first input 'provide_posn' having two arguments. The '0,1' refers to switching the function off or on, and the 'n' refers to the frequency of position updates: position information is required every n seconds. The second input is the identity of the requesting application.

The outputs produced from the application are position information in the form of an 'x,y' grid co-ordinate. The second output argument is the requestor so that the task controller 210 can route the message to the appropriate destination.

The above example shows a relatively simple device having few I/O requirements, but illustrates the process of registering a new application with the resource management module 215. Applications having more complex I/O requirements may be registered with the necessary extra information added. Alternatively, it may be possible to register new applications with only the information concerning their label and logical slot number. The information related to their I/O characteristics may not need to be explicitly defined in the resource management module.

Once a new application has been added, the other pre-existing applications need to be made aware of the new applications presence. This occurs at initialization, which can occur at power-up of the apparatus, or after a system reset. Either of these will normally be necessary after installing a new application.

The initialization process may differ depending on the exact nature of the system. However, at initialization, the central processor reviews all the physical hardware present, and all the software applications loaded. In this way, the control processor is able to ensure that it is aware of all installed applications.

If pre-installed applications need to interact with newly installed applications, then it may be necessary to upgrade the software of the pre-installed applications to update their I/O capabilities. For example, a pre-installed application could be configured to provide new services if the pre-installed application was able to accept a new kind of input, which could be processed with further changes to its existing software. Such upgrades or patches can be made available with the acquisition of the new applications.

However, some new applications will only need to communicate with the I/O controller, and as such will not need to exchange messages with modules other than the central processor. Such a new application, therefore, must be able to create and receive messages encoded according to the same mark-up language structure as the other modules. The central processor, in a routing role, only has to pass any messages from such an application onto the I/O controller and vice-versa.

The main function of the task controller 210, is to co-ordinate the activity of the various application units, and particularly to route communication between the applications using data stored in the resource management module 215. To understand the roles played by the various other modules of the unit 200, it is helpful to rank each type in order of intelligence. The true intelligence in the system lies with the application units: they are configured to perform specific tasks and may comprise specialist hardware and/or software.

The task controller 210 has the main function of managing the applications, and as such, needs to interpret messages from the applications and the I/O controller 205 in order to route them to their defined destination. However, the task controller also needs to perform background system management tasks to ensure that the entire unit is operating effectively. As such, the task controller 210 is less intelligent than the applications, but more intelligent than the I/O controller 205.

The I/O controller 205 is a passive module, in the sense that the I/O controller never initiates any activity itself; it only acts in accordance with instructions originating from, or routed by the task controller 210 in order to produce an output, or in response to a user input such as a key press or a voice input.

By using a common mark-up language for all inter-module communication, a given application can send a message to the I/O controller 205, for visual display, or audio output, to the user, with minimal or no processing required by the task controller 210. For instance, if the navigation system 220 needs to alert the user to an upcoming manoeuvre, the navigation system can send a message indicating that the destination is the I/O controller 205, and the task controller will receive the message, determine that the message is destined for the I/O controller, and using its routing function, pass the message straight on, with no further processing being required. In prior art systems, such a message, in a first format, would be received by a central processor, which would then re-format the message, into a second format suitable for the I/O controller, before re-transmitting it to the I/O controller.

The task controller 210 receives all messages, and is able to ascertain their origin and destination by decoding the relevant information from the message, which is identified with tags which are defined for this purpose.

The task controller, when operating in this routing capacity, is concerned only with decoding the tags which are necessary in order to re-transmit the message to its intended destination. The task controller need have no further knowledge of other tags in the message, which will be understood and decoded by the destination module. In the case where the task controller is the intended recipient of a message, then certain tags within the message will need further decoding by the task controller so that the instructions or information to which they relate can be acted upon as necessary.

The following example demonstrates how the task controller acts to merely route messages to their intended destinations. It can do this by examining the headers, which form part of each message. Conceptually, the message can be considered as resembling:

<source><destination><body of message>

By decoding this, and cross-referencing with the information stored in the resource management module, the task controller is able to route each message to the correct application, or to act on the message itself, if that is required.

An example of a message transfer that occurs between applications, with only occasional messages being sent to the I/O controller 205 is as follows. In order to guide the user to a chosen destination, the navigation system 220 needs access to data representing the current position of the vehicle. To achieve this, the navigation system 220 can initiate a process within the GPS application 240, which instructs the GPS application to provide periodic messages to the navigation system containing the current position of the vehicle.

Figure 2:
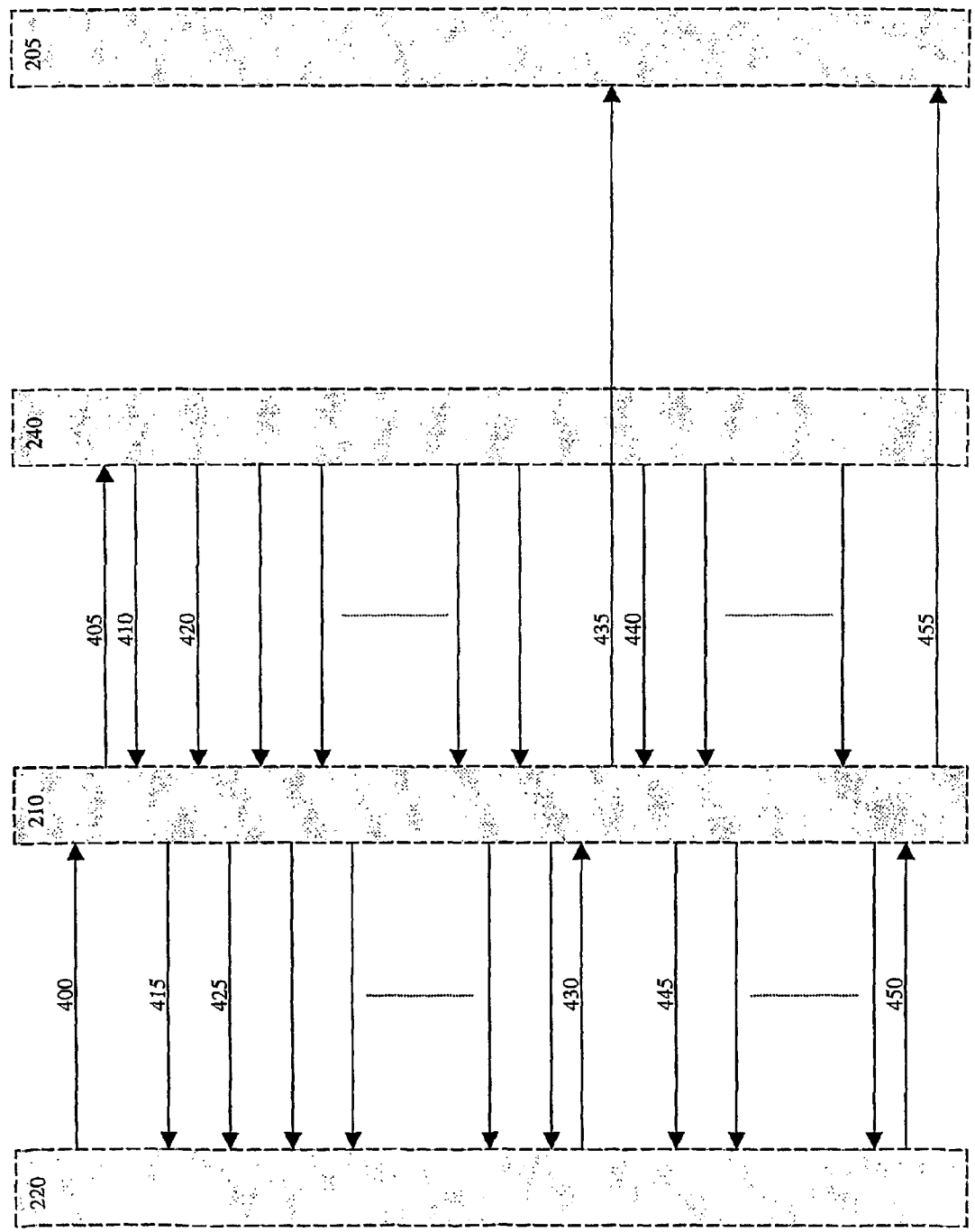
FIG. 2 shows an example of a series of message transfers between modules of the telematics unit of FIG. 1.

The message exchanges resulting from such a process can be seen in FIG. 2. The large boxes represent system components, and have the same reference numerals as in FIG. 1. The arrows represent individual messages.

The first message 400 is from the navigation system 220, and is destined for the GPS application 240. The first message 405 is first received by the task controller 210, which decodes its header, realizes the first message is meant for the GPS application 240, and routes the first message there directly without any further processing. Thus, message 405 is the same message as 400, and is directed to the GPS application 240.

The GPS application 240 receives message 405, and acts according to the instructions contained within message 405. In this case, the instructions are to provide the navigation system with updates on the vehicle position every n seconds.

FIG. 2 shows that the GPS application 240 transmits new messages 410 and 420, containing updated position information, to the task controller 210 which duly routes them to the navigation system 220, as messages 415 and 425 respectively, with no further processing.

This process is repeated, as shown in FIG. 2, until the position data reveals to the navigation system 220 that a change in course is now necessary in order to follow the calculated route. The navigation system 220 transmits message 430, which is destined for the I/O controller 205. Message 430 is received by the task controller 210, which decodes its headers, realizes that message 430 is destined for the I/O controller 205, and so routes it onwards as message 435, with no further processing.

The I/O controller 205 receives message 435, which is coded according to the defined format for all messages in the system 200, and acts to carry out the instruction contained therein. In this case, the message instructs the I/O controller to alert the driver of the vehicle to an upcoming change in direction. This may be a visual indication and/or an audible signal to the user.

As the GPS application 240 is still under instructions to provide regular updates on the vehicle position, the GPS application continues to transmit messages containing positional information. Message 440 is transmitted to the task controller 210, which routes message 440 onwards to the navigation system 220 as message 445, in the normal fashion.

This process is again repeated until such time as another change in direction is called for. At this time, message 450 is transmitted to the I/O controller 205, via the task controller 210, as message 455.

This whole process continues until the navigation system 220 sends a message to the GPS application 240 to halt transmitting regular updates. This may happen once the destination is reached, or if the user manually decides to stop the navigation process.

The mark-up language is not described here in any detail as variants of mark-up languages, such as WML and HTML, are well known in the art, and a skilled person will appreciate that any modifications necessary to any particular language will depend upon the particular syntax and structure of that language.

It may be desirable to differentiate newly introduced tags from the existing tags used in HTML or WML. For instance, the new tag for indicating the source of a message, may be represented as: <_SOURCE>, where the underscore character serves to distinguish it from a regular HTML or WML tag. However, it is possible to distinguish such tags in any way chosen by the system designer, or indeed, it may not even be necessary to distinguish the new tags at all.

However, in order to ensure the interoperability of any new applications with existing ones, the structure and syntax of the mark-up language should be known to third parties who may wish to produce applications for use with the telematics unit.

While the invention has been described in the particular context of an in-vehicle telematics unit, the skilled man will realize that it is by no means limited to use in such an environment.

The present invention includes any novel feature or combination of features disclosed herein either explicitly or any generalisation thereof irrespective of whether or not relating to the claimed invention or mitigates any or all of the problems addressed.

The invention claimed is:

1. An apparatus comprising:
   an input/output controller comprising at least one input means configured to receive instructions from a user, and at least one output means configured to convey information to a user, responsive to messages encoded using a predetermined markup language comprising tags; and
   a processor configured for providing a routing function and hosting a plurality of applications, the applications being configured to communicate with one another, via the processor, using messages having the structure of the predetermined markup language and each message including a tag which provides an indication of the destination of the message, and wherein the routing function being configured to use the destination tag to route each message to its destination, wherein the processor is configured so that messages transmitted between applications, via the processor, are transmitted within the apparatus.

2. An apparatus as claimed in claim 1 wherein the routing function is operable to use information stored in a database.

3. An apparatus as claimed in claim 2 wherein computational power is distributed amongst the applications.

4. An apparatus as claimed in claim 3 wherein the processor hosts additional applications.

5. An apparatus as claimed in claim 4 wherein an electrical connector is provided for the addition of a new hardware application.

6. An apparatus as claimed in claim 3, wherein the processor stores information about the additional application in the database.

7. An apparatus as claimed in claim 6 wherein an electrical connector is provided for the addition of a new hardware application.

8. An apparatus as claimed in claim 2 wherein the processor hosts additional applications.

9. An apparatus as claimed in claim 8, wherein the processor stores information about the additional application in the database.

10. An apparatus as claimed in claim 9 wherein an electrical connector is provided for the addition of a new hardware application.

11. An apparatus as claimed in claim 8 wherein an electrical connector is provided for the addition of a new hardware application.

12. An apparatus as claimed in claim 1 wherein computational power is distributed amongst the applications.

13. An apparatus as claimed in claim 12 wherein the processor hosts additional applications.

14. An apparatus as claimed in claim 13 wherein an electrical connector is provided for the addition of a new hardware application.

15. An apparatus as claimed in claim 1 wherein the processor hosts additional applications.

16. An apparatus as claimed in claim 15 wherein an electrical connector is provided for the addition of a new hardware application.

17. An apparatus as claimed in claim 1 wherein the markup language includes elements of HTML or WML.

18. An apparatus as claimed in claim 1 wherein the apparatus is an in-vehicle unit.

19. A communication apparatus as claimed in claim 18, wherein the at least one input means is operable by a user of the apparatus.

20. A communication apparatus as claimed in claim 1, wherein the input/output controller is operable to encode instructions received from the user in the predetermined markup language.

21. An apparatus as claimed in claim 1, further comprising a database configured to store information relating to the applications and updateable to include information relating to at least one new application hosted by the processor, the processor being configured to use the information stored in the database to route messages between the applications hosted by the processor.

22. A method comprising:
encoding message transfers between an input/output controller of a modular communication apparatus and a processor of a modular communication apparatus, which provides a routing function, using a predetermined markup language comprising tags,
using a structure of the predetermined marked-up language for communications between the processor and an application hosted by the processor,
using messages having the structure of the predetermined markup language for communications between applications hosted by the processor, via the processor, wherein each message includes a destination tag which provides an indication of a destination of the message, and
causing routing of each message to its destination using the routing function and the destination tag, wherein the processor is configured so that messages transmitted between applications, via the processor, are transmitted within the modular communication apparatus.

23. A method as claimed in claim 22 wherein the routing function is operable to use information stored in a database.

24. A method as claimed in claim 22 wherein computational power is distributed amongst the applications.

25. A method as claimed in claim 22 wherein the processor hosts additional applications.

26. A method as claimed in claim 25, wherein the processor stores information about the additional application in the database.

27. A method as claimed in claim 25 wherein an electrical connector is provided for the addition of a new hardware application.

28. A method as claimed in claim 22 wherein the markup language includes elements of HTML or WML.

29. A method as claimed in claim 22 wherein the apparatus is an in-vehicle unit.

30. A method as claimed in claim 29, wherein the at least one input means is operable by a user of the apparatus.

31. A method as claimed in claim 22, further comprising encoding instructions received from the user in the predetermined markup language at the input/output controller.

32. A computer readable storage medium encoded with instructions that, when executed by a processor, perform the method of claim 22.

33. A plurality of computer programs stored on a computer-readable storage medium, each implementing an application to be hosted by a processor, wherein each of the applications are arranged to communicate with one another, via the processor, using messages encoded in a predetermined markup language comprising tags, wherein each message includes a tag which provides an indication of the destination of the message, wherein the processor is configured so that messages transmitted between applications, via the processor, are transmitted within an apparatus that includes the processor.

34. A plurality of computer programs as claimed in claim 33, wherein the apparatus is an in-vehicle unit.

35. An apparatus comprising a processor and memory including computer program code, the memory and computer program code configured to, with the processor cause the apparatus at least to:
encode message transfers between an input/output controller of a modular communication apparatus and the processor, which provides a routing function, using a predetermined markup language comprising tags,
use a structure of the predetermined marked-up language for communications between the processor and an application hosted by the processor,
use messages having the structure of the predetermined markup language for communications between applications hosted by the processor, via the processor, wherein each message includes a destination tag which provides an indication of the destination of the message, and
cause routing of each message to its destination using the routing function and the destination tag, wherein the processor is configured so that messages transmitted between applications, via the processor, are transmitted within the modular communication apparatus.

* * * * *